Figure 4:
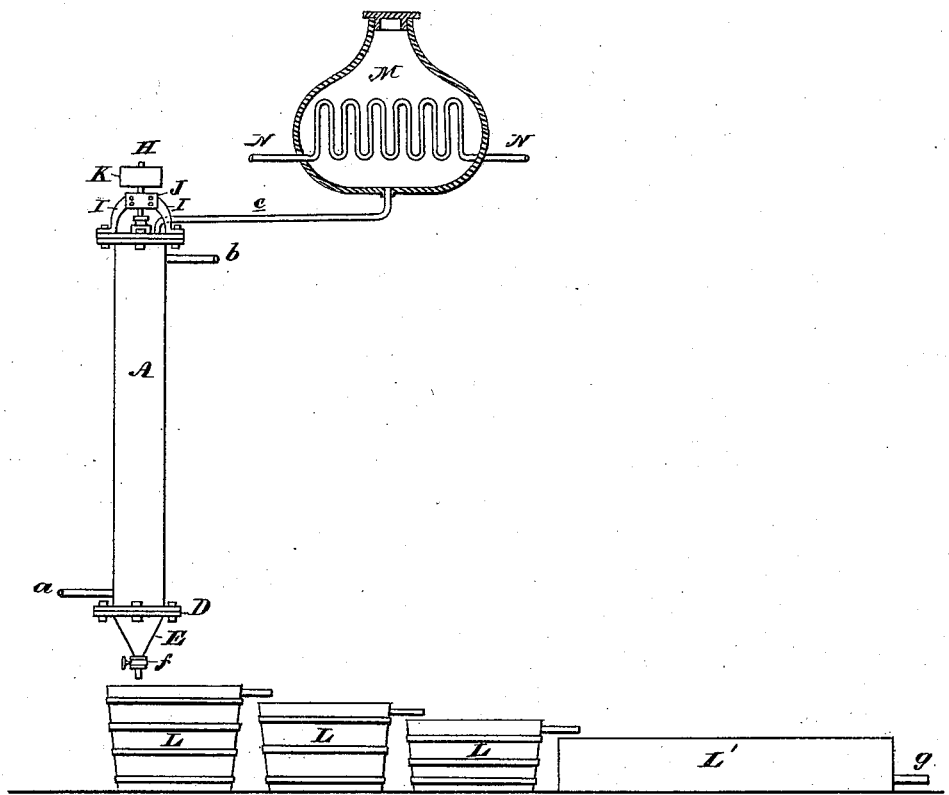

(Model.)
2 Sheets—Sheet 1.
E. BRADLEY.
Purifying Extracts of Bark.
No. 230,398. Patented July 27, 1880.
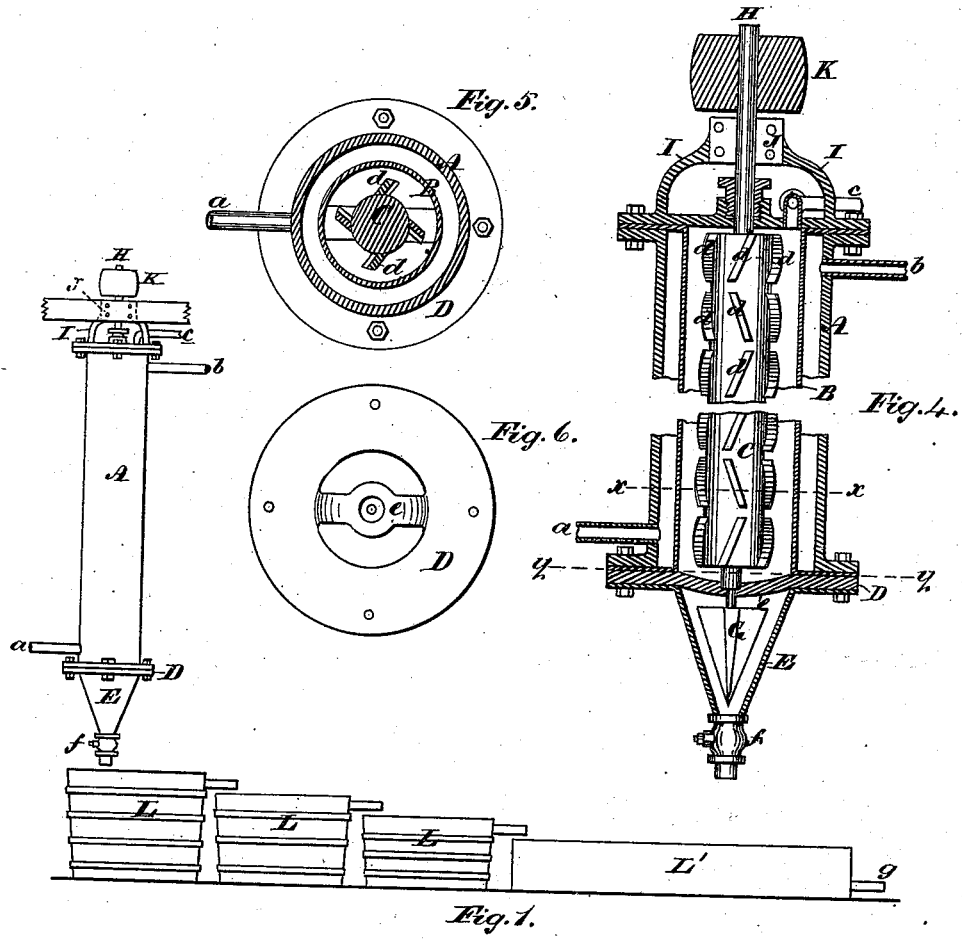
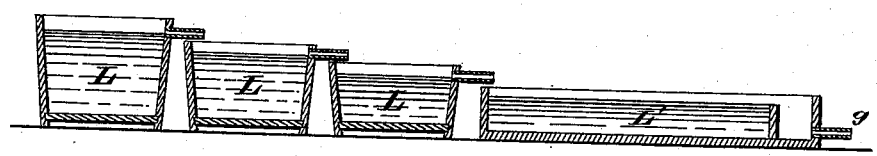
Fig. 1.
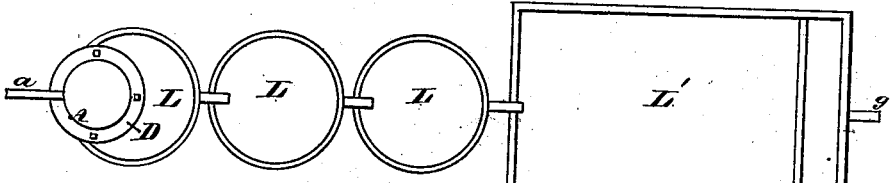
Fig. 2.
Fig. 3.
Witnesses:
John Grist
Fred. J. Ross
Inventor
E. Bradley
By Henry Grist
Attorney (Model.) 2 Sheets—Sheet 2.

E. BRADLEY.
Purifying Extracts of Bark.

No. 230,398. Patented July 27, 1880.

Witnesses:
John Grist,
Fred. J. Ross.

Inventor.
E. Bradley,
By Henry Grist
Attorney.

UNITED STATES PATENT OFFICE.

EARNSHAW BRADLEY, OF THREE RIVERS, QUEBEC, CANADA.

PURIFYING EXTRACTS OF BARK.

SPECIFICATION forming part of Letters Patent No. 230,398, dated July 27, 1880.

Application filed May 22, 1880. (Model.) Patented in Canada February 28, 1880.

*To all whom it may concern:*

Be it known that I, EARNSHAW BRADLEY, of Three Rivers, in the county of Three Rivers, in the Province of Quebec, Canada, have invented a certain new and useful Improvement in Processes and Apparatus for Purifying Bark Extracts; and I do hereby declare that the following is a full, clear, and exact description of the same.

Tan-bark extract, as it comes from the leaches, contains fine particles of bark and holds in solution resinous gums. Various modes of filtration have been unsuccessful, principally owing to the gums in solution choking the filtering material, and the gums prevent the deposit of the fine floating particles of bark and other foreign substances; hence a refined fluid extract has not heretofore been readily obtainable. Unrefined fluid extract of tan-bark ill performs the function of tanning hides, owing to the resinous gums and fine particles clogging the pores, and prevents or mitigates the penetration of the tannin extract. A refined fluid extract in which the gums and floating particles of bark, &c., have been removed is a desideratum, and has been long sought for.

The object of my invention is to remove by precipitation the resinous gums and floating particles of bark from the extract emanating from leach-tubs; and my invention consists, first, in the process of causing precipitation, which consists in concentrating the leached extract by artificial evaporation, then rapidly cooling the same, and passing the cooled concentrated extract through a series of troughs overflowing into one another, wherein the sediment is deposited, the pure liquor passing from the surface of the last trough into a reservoir at a lower level; second, in a cooler consisting of an outer and an inner cylinder, having a tapering outlet, and an agitator-shaft, whereby a flow of cold water is passed between the cylinders, while the extract to be cooled passes through the inner cylinder, which has a central shaft with agitating-arms; third, in combination, a heater or evaporator, a cooler, and a series of pans arranged to overflow into one another for deposit of sediment during precipitation.

Figure 1 is a side elevation of my apparatus. Fig. 2 is a section of the pans, showing levels of extract in passing through the same. Fig. 3 is a plan of Fig. 1. Fig. 4 is an enlarged sectional view of the cooler. Fig. 5 is a section of Fig. 4 on line $x\ x$. Fig. 6 is a section on line $y\ y$, Fig. 4. Fig. 7 is an elevation of the combined apparatus, showing, in section, a heater or evaporator (marked M) of any suitable construction, with steam-coil N.

The extract, as obtained by leaching the bark in ordinary leaches or tubs, is conveyed to an evaporator, and concentrated by artificial evaporation to a density of from 7° to 11° of Baumé's hydrometer, 10° being the preferred density. It is then conveyed while hot to a suitable cooler and rapidly cooled to a temperature of from 60° to 80° Fahrenheit. From the cooler the condensed extract passes into a series of tubs of varying heights, arranged to overflow into one another, or he tubs may be of uniform height, arranged in steps, to receive the overflow from one to another and into a long shallow tank, and thence into a reservoir which receives the purified extract. The sediment is deposited in each tub, the grosser particles of foreign matter being deposited in the tub nearest the cooler, the finer particles, in corresponding ratio, being deposited in the succeeding tubs and tanks until the extract, refined from all impurities, flows into a storage-reservoir, to be concentrated for market, or into the tanning-vats, as may be desired; or the cooled extract may be run off into a series of tubs, as before described, each tub provided with a valved outlet, and the extract allowed to stand therein until the sediment is precipitated below the outlets, which are then opened, whereby the purified extract will flow into lower tubs.

If the extract before cooling is of less density than 9° or 11° Baumé, it will not deposit all the sediment in the tubs, and with increased density the deposit will only be partial, and if of the density as it comes from the leaches very little precipitation of sediment will be effected.

The lower the temperature of the extract when it comes from the cooler, until 60° or 70° Fahrenheit is reached, the more sediment will be deposited in the primary tubs. If the extract is filtered before cooling, or if cooled as it comes from the leaches, scarcely any sedimentary deposit would be obtained.

It will thus be observed that the essential elements of my process are, first, the rapid cooling of the extract after it has been concentrated to a density of from 7° to 12° of Baumé's hydrometer, to cause the sediment to precipitate; second, in collecting the sediment set free by the cooler in a series of tubs and shallow pans, the extract flowing from one tub to another, each tub remaining nearly full to let the sediment collect, until it finally passes from the trough in an observable clear state.

I will now proceed to describe my apparatus for carrying out my process.

The leaches and evaporator I need not describe, as they are in ordinary use and well known to all persons skilled in the art of obtaining and concentrating extract of barks.

A B are two concentric cylinders, the outer space forming a water-jacket or cooling-chamber, of which $a$ is the inlet, connected to a source of water-supply, and $b$ an outlet to carry off the same, thus causing a circulation through the water-space.

The cylinder B is preferably of sheet-copper, and into the space between it and the revolving shaft C, with agitators $d$ on it, concentrated extract, while hot, is admitted through the inlet $c$.

C is a hollow shaft provided with agitators $d$, and which shaft is stepped into a bridge, $e$, of the end plate, D, of the cylinder, said plate closing the water-space between the two cylinders and opening into a conical chamber, E, attached to the bottom of plate D, the outlet provided with a stop-valve, $f$.

The chamber E has internally a wing, G, a little smaller than the conical chamber E, and is journaled therein by connection with the end of the shaft C, to revolve and keep the liquor agitated, and thus prevent the valve $f$ from becoming choked. The agitators $d$ are set inclinedly on the shaft in inverse order to cause counteraction.

The agitator-shaft C is driven by connection with a shaft, H, passing through the end plate of the cylinders A B.

I are brackets carrying a bearing, J, for the shaft H, which has a pulley, K, for driving the same by a belt from any suitable motive power.

The concentrated extract becomes cooled in passing through the cooler and falls into a series of troughs or tubs, L, arranged to flow or to overflow into one another consecutively, the last one discharging into a shallow trough, L'. The concentrated extract, while in these tubs and pan, deposits sediment, the particles graduating in fineness from the first tub toward the trough L', from whence it passes, by overflow-pipes $g$, into a suitable receiver, in a clear state, free from sediment.

Extract which has been concentrated to the ordinary density of, say, 30° Baumé, without being purified by my process can be purified by diluting it with water to about 10° Baumé, and while hot passing it through the cooler and thence into the troughs to purify the same by precipitation of sedimentary deposit.

I claim as my invention—

1. The process of purifying extract of bark by precipitation, consisting in condensing the leached extract to the density of about 10° Baumé by evaporation, and while hot rapidly cooling the same, then flowing the cooled condensed extract into a series of tubs or tanks overflowing into one another, wherein the matter set free by the action of cooling is precipitated, as set forth.

2. An apparatus for purifying partially concentrated bark extract comprising an evaporator or heater, M N, a jacketed cooler, A B, provided with shaft C, bearing agitators $d$ and G, and a series of tubs or tanks arranged to overflow into one another and into a receiver, substantially as herein set forth.

3. A cooler consisting of cylinder B, having cone bottom E, with valved outlet $f$, shaft C, provided with agitators $d$, and terminal wing G, and concentric jacket A, having inlet and outlet tubes $a$ $b$, as set forth.

E. BRADLEY.

Witnesses:
F. F. FARMER,
ALEX. HOULISTON.